United States Patent
Mashimo

(10) Patent No.: US 9,749,499 B2
(45) Date of Patent: Aug. 29, 2017

(54) SECURITY PRINTING SYSTEM THAT OBTAINS BIOLOGICAL INFORMATION VIA MOBILE COMMUNICATION DEVICE, SECURITY PRINTING METHOD, AND IMAGE FORMING APPARATUS

(71) Applicant: Kyocera Document Solutions Inc., Osaka (JP)

(72) Inventor: Takayuki Mashimo, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/167,979

(22) Filed: May 27, 2016

(65) Prior Publication Data
US 2016/0352969 A1    Dec. 1, 2016

(30) Foreign Application Priority Data
May 27, 2015   (JP) ................................. 2015-108002

(51) Int. Cl.
| | |
|---|---|
| G06K 15/00 | (2006.01) |
| G06F 3/12 | (2006.01) |
| H04N 1/44 | (2006.01) |
| H04W 4/00 | (2009.01) |

(52) U.S. Cl.
CPC ........... *H04N 1/442* (2013.01); *G06F 3/1222* (2013.01); *G06F 3/1238* (2013.01); *G06F 3/1243* (2013.01); *G06F 3/1292* (2013.01); *H04W 4/008* (2013.01)

(58) Field of Classification Search
CPC .............................. H04N 1/442; H04W 4/008
USPC .................................................. 358/1.1–1.18
See application file for complete search history.

(56) References Cited

U.S. PATENT DOCUMENTS

| | | | | |
|---|---|---|---|---|
| 7,812,986 B2* | 10/2010 | Graham | ................. | G06K 9/325 358/1.15 |
| 8,493,582 B2* | 7/2013 | Murakami | ............ | G06F 21/608 358/1.13 |
| 2007/0052997 A1* | 3/2007 | Hull | ................... | G06K 9/00463 358/1.15 |
| 2016/0248926 A1* | 8/2016 | Yasuda | ............. | H04N 1/00307 |

FOREIGN PATENT DOCUMENTS

JP    2008-259138 A    10/2008

* cited by examiner

*Primary Examiner* — Gabriel Garcia
(74) *Attorney, Agent, or Firm* — James Judge

(57) ABSTRACT

A security printing system includes an image forming apparatus and a mobile communication device. The image forming apparatus includes a biological information input circuit, a printed matter storing unit, at least one sheet discharge tray, an image forming circuit, and a control circuit. The biological information input circuit inputs biological information. The biological information is preliminary registered as registered biological information with the mobile communication device. The control circuit creates a printed matter in response to a match between the biological information and the registered biological information. The biological information is input by the biological information input circuit. The registered biological information is obtained by the short range wireless communications. The control circuit discharges the created printed matter to any of the at least one sheet discharge tray when the short range wireless communications are in a predetermined predefined state.

7 Claims, 5 Drawing Sheets

SECURITY PRINTING SYSTEM THAT OBTAINS BIOLOGICAL INFORMATION VIA MOBILE COMMUNICATION DEVICE, SECURITY PRINTING METHOD, AND IMAGE FORMING APPARATUS

INCORPORATION BY REFERENCE

This application is based upon, and claims the benefit of priority from, corresponding Japanese Patent Application No. 2015-108002 filed in the Japan Patent Office on May 27, 2015, the entire contents of which are incorporated herein by reference.

BACKGROUND

Unless otherwise indicated herein, the description in this section is not prior art to the claims in this application and is not admitted to be prior art by inclusion in this section.

Recently, at copying and printing confidential documents, there may be a case where a printed matter is forgotten to be taken after creating the printed matter, causing a security problem. The following typical methods have also been proposed as a technique to prevent such problem. One method is to start printing by an authentication process with password. Another method is to perform authentication to take out a printed matter output to a sheet discharge tray with cover when a print operation is performed from a terminal at a remote location. Meanwhile, there is also disclosed a technique to promote a user so as not to be away of a neighborhood of an image reading apparatus at copying a confidential document.

SUMMARY

A security printing system according to one aspect of the disclosure includes an image forming apparatus and a mobile communication device. The image forming apparatus includes a biological information input circuit, a printed matter storing unit, at least one sheet discharge tray, an image forming circuit, and a control circuit. The biological information input circuit inputs biological information. The biological information is preliminary registered as registered biological information with the mobile communication device. The image forming apparatus and the mobile communication device ensure connection by preliminary configured short range wireless communications. The control circuit creates a printed matter in response to a match between the biological information and the registered biological information. The biological information is input by the biological information input circuit. The registered biological information is obtained by the short range wireless communications. The control circuit discharges the created printed matter to any of the at least one sheet discharge tray when the short range wireless communications are in a predetermined predefined state.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
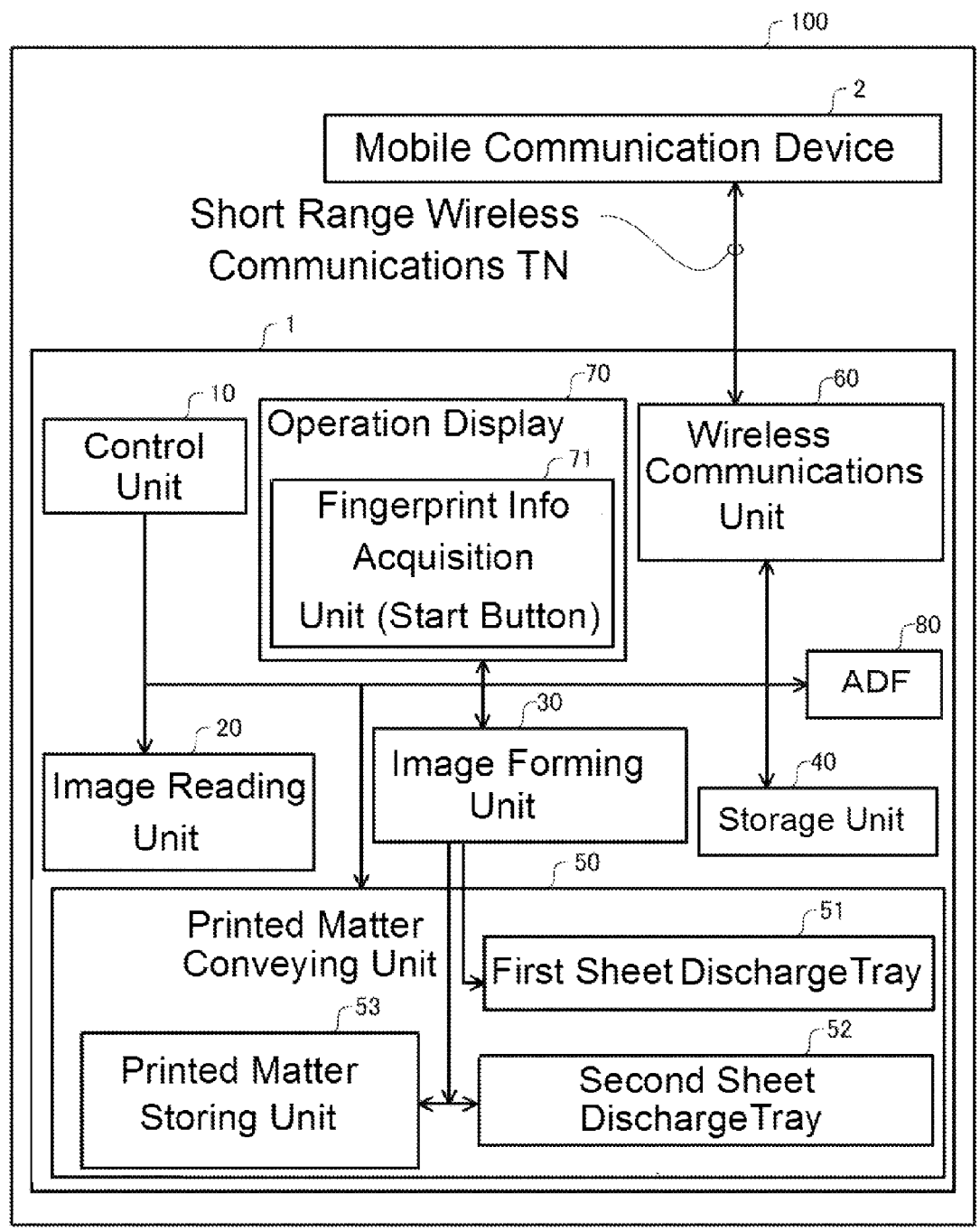
FIG. 1 illustrates a functional configuration of a security printing system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes aspects to embody the disclosure (hereinafter referred to as "embodiments") with reference to the drawings.

FIG. 1 illustrates a functional configuration of a security printing system 100 according to one embodiment of the disclosure. The security printing system 100 includes an image forming apparatus 1 and a mobile communication device 2. The image forming apparatus 1 includes a control unit (also referred to as a control circuit) 10, an image reading unit 20, an image forming unit (also referred to as an image forming circuit) 30, which forms images on a print medium, a storage unit 40, a printed matter conveying unit 50, a wireless communications unit 60, an operation display 70, and an automatic document feeder (ADF) 80. The operation display 70 includes a start button 71. The start button 71 also functions as a fingerprint information acquisition unit that can obtain fingerprint information. The wireless communications unit 60 is connectable to the mobile communication device 2 by short range wireless communications TN. In this embodiment, the mobile communication device 2 is simply referred to as a PDA and has a wide meaning. For example, a tablet and a mobile phone are included in the mobile communication device 2.

The control unit 10 includes: a main storage unit such as a RAM and a ROM and a control unit such as a microprocessing unit (MPU) and a central processing unit (CPU). The control unit 10 has a controller function related to interfaces such as various I/Os, a universal serial bus (USB), a bus, and another hardware and controls the entire image forming apparatus 1.

The storage unit 40 is a storage device configured of a hard disk drive, a flash memory, or a similar medium which are non-transitory recording mediums. The storage unit 40 stores control programs and data for processes executed by the control unit 10.

Figure 2:
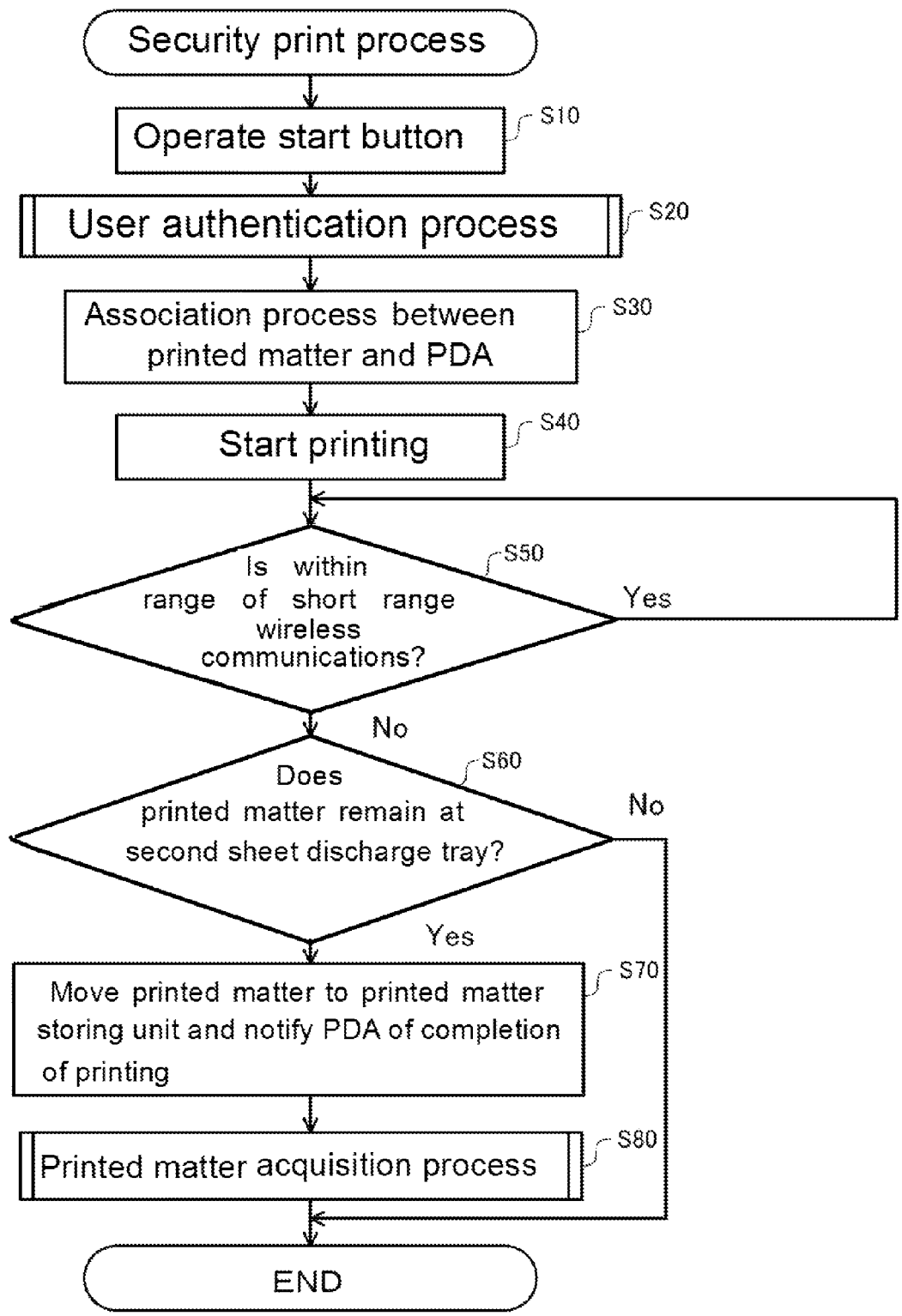
FIG. 2 illustrates a procedure for a security print process according to the one embodiment.

FIG. 2 illustrates a procedure for a security print process according to the one embodiment. At Step S10, the user operates the start button 71 in the image forming apparatus 1. At Step S20, the image forming apparatus 1 executes a user authentication process according to the operation with the start button 71.

Figure 3:
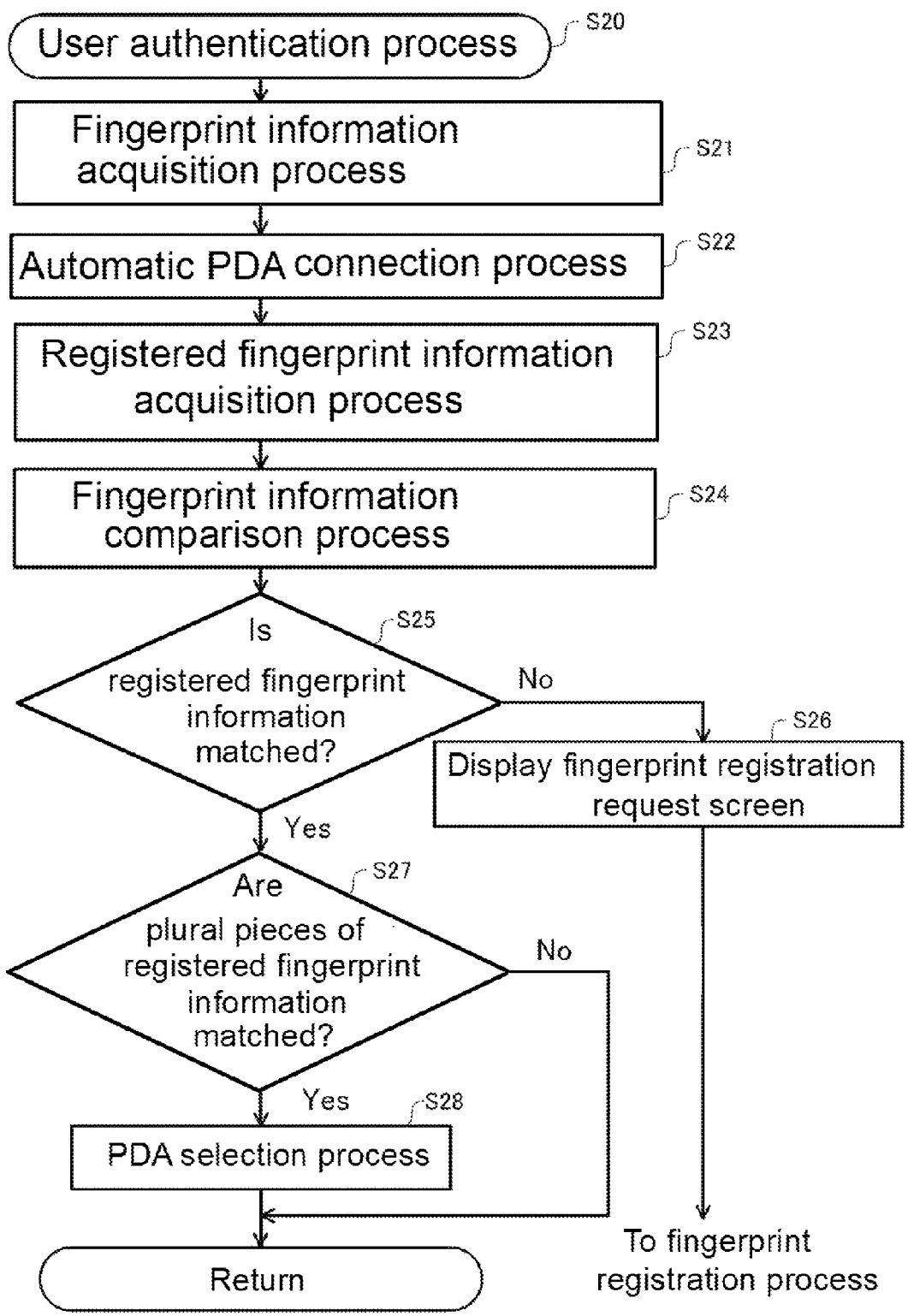
FIG. 3 illustrates a procedure for a user authentication process according to the one embodiment.

FIG. 3 illustrates a procedure for the user authentication process according to the one embodiment. At Step S21, the image forming apparatus 1 executes a fingerprint information acquisition process. The fingerprint information acquisition process is a process that obtains the fingerprint information of the user with the start button 71, which also functions as the fingerprint information acquisition unit. At Step S22, the image forming apparatus 1 executes an automatic PDA connection process. The automatic PDA connection process is a process where the image forming apparatus 1 uses the wireless communications unit 60 to automatically connect to the mobile communication device 2 by the short range wireless communications TN.

This embodiment uses BLUETOOTH (registered trademark) CLASS 1 for the short range wireless communications TN. BLUETOOTH CLASS 1 is communications at an output of 1 mW. BLUETOOTH CLASS 1 is short range wireless communications by which communications at a distance between the security printing system 100 and the mobile communication device 2 of about within 1 m are possible.

At Step S23, the image forming apparatus 1 executes a registered fingerprint information acquisition process. The registered fingerprint information acquisition process is a process where the image forming apparatus 1 obtains fingerprint information preliminary registered with the mobile communication device 2 via the short range wireless communications TN.

The registered fingerprint information is preliminary registered with the mobile communication device 2 before a start of the security print process. The registered fingerprint information can be registered, for example, using the start button 71, which also functions as the fingerprint information acquisition unit. A procedure for obtaining the registered fingerprint information is preliminary set in the control unit 10.

At Step S24, the control unit 10 executes a fingerprint information comparison process. The fingerprint information comparison process is a process that compares the fingerprint information, which is obtained with the start button 71, with the registered fingerprint information, which is preliminary registered with one or a plurality of the mobile communication devices 2. At Step S25, when there is at least one match between both, the control unit 10 advances the process to Step S27. When there is no match between both, the control unit 10 advances the process to Step S26. At Step S26, the security printing system 100 displays a fingerprint registration request screen on the operation display 70 to prompt the user to perform the above-described fingerprint registration process.

At Step S27, the control unit 10 decides whether the fingerprint information matches the plurality of pieces of registered fingerprint information or not. When the fingerprint information matches one piece of the registered fingerprint information, the control unit 10 returns the process to the security print process (see FIG. 2). When the fingerprint information matches the plurality of pieces of registered fingerprint information, the control unit 10 advances the process to Step S28. At Step S28, the security printing system 100 executes a PDA selection process. The PDA selection process is a process that allows the user to select any of the plurality of PDAs 2 connected by the short range wireless communications TN on the operation display 70.

This embodiment assumes that the identical fingerprint information has been registered with the plurality of PDAs 2. This assumption assumes the case where, for example, family visits a business center or a convenience store that have the image forming apparatus 1. In this case, a parent has registered the fingerprint information of a child with the PDA 2. This allows the parent to approve a copying and printing by the child with the start button 71, ensuring achieving high convenience. Furthermore, also lending or giving the parent's PDA 2 to the child ensures achieving a similar convenience assuming the approval by the parent with the start button 71.

At Step S30 (see FIG. 2), the control unit 10 associates the selected PDA 2 (or the only one PDA 2 connected by the short range wireless communications TN) with a printed matter, which is a copied material for a document set to the automatic document feeder 80. At Step S40, the image forming apparatus 1 starts printing. Usually, while the automatic document feeder 80 operates at a high speed and completes image reading comparatively early, the automatic document feeder 80 continues the printing process steadily. In the printing process, for example, a printed matter to which an image on a confidential document has been copied is supplied to the printed matter conveying unit 50.

The printed matter conveying unit 50 includes a first sheet discharge tray 51, a second sheet discharge tray 52, and a printed matter storing unit 53. The printed matter storing unit 53 is located in the image forming apparatus 1 where the user can neither visually check nor obtain the printed matter.

The first sheet discharge tray 51 is a tray to which a printed matter on which the association process (see Step S30) is not performed with the PDA 2 is discharged. The second sheet discharge tray 52 is a tray to which a printed matter on which the association process has been performed with the PDA 2 is discharged. The printed matter conveying unit 50 can convey the printed matter discharged to the second sheet discharge tray 52 to the printed matter storing unit 53 and also discharge the printed matter from the printed matter storing unit 53 to the second sheet discharge tray 52.

At Step S50, the control unit 10 decides whether the selected PDA 2 or a similar terminal is within a range of the short range wireless communications or not. Actually, the control unit 10 decides whether the selected PDA 2 or a similar terminal is kept connected by the short range wireless communications TN or not. In this respect, generally, after completion of the printing process and acquisition of the printed matter discharged to the second sheet discharge tray 52 during connection by the short range wireless communications TN, the user leaves from the image forming apparatus 1. This makes the PDA 2 or a similar terminal outside the range of the short range wireless communication, the short range wireless communications TN are disconnected, and the process proceeds to Step S60.

At Step S60, the control unit 10 decides whether a printed matter remains at the second sheet discharge tray 52 or not. This decision is made using a sensor (not illustrated) equipped with the second sheet discharge tray 52. When the printed matter does not remain at the second sheet discharge tray 52, the control unit 10 completes the process, because in this case, as described above, the user can determine that the printed matter has already been obtained. On the other hand, when the printed matter remains at the second sheet discharge tray 52, the control unit 10 advances the process to Step S70. Specifically, this case, for example, corresponds to the case where reading of all documents set to the automatic document feeder 80 has been terminated and after recovering the documents, the user leaves the printed matters and goes away from the image forming apparatus 1.

However, the control unit 10 waits an elapse of a certain period of time (for example, several seconds) (The short range wireless communications TN are kept disconnected continuously.) and then advances the process to Step S70. The reason for waiting the elapse of the certain period of time is to prevent a chattering when the user moves to a neighborhood of a boundary of the range of the short range wireless communications together with the PDA 2.

At Step S70, the control unit 10 controls the printed matter conveying unit 50 and conveys the printed matter from the second sheet discharge tray 52 to the printed matter storing unit 53. This avoids an unspecified third person sees and mistakenly takes a document containing personal information and other confidential documents with him/her. Thus, according to this embodiment, even if the printed matter is left after printing, this ensures achieving a state where security is ensured and a printed matter can be obtained at any time without a special operation. On the other hand, the usual printing without authentication with the PDA 2 can be performed using the first sheet discharge tray 51 also in this state.

Furthermore, at Step S70, the image forming apparatus 1 uses the wireless communications unit 60 to notify the mobile communication device 2 of the completion of printing. The process proceeds to Step S80. The mobile communication device 2 calls a user's attention by a method using, for example, a vibrator, a ringtone, and an alert mail and displays the completion of printing on a screen (not illustrated).

Figure 4:
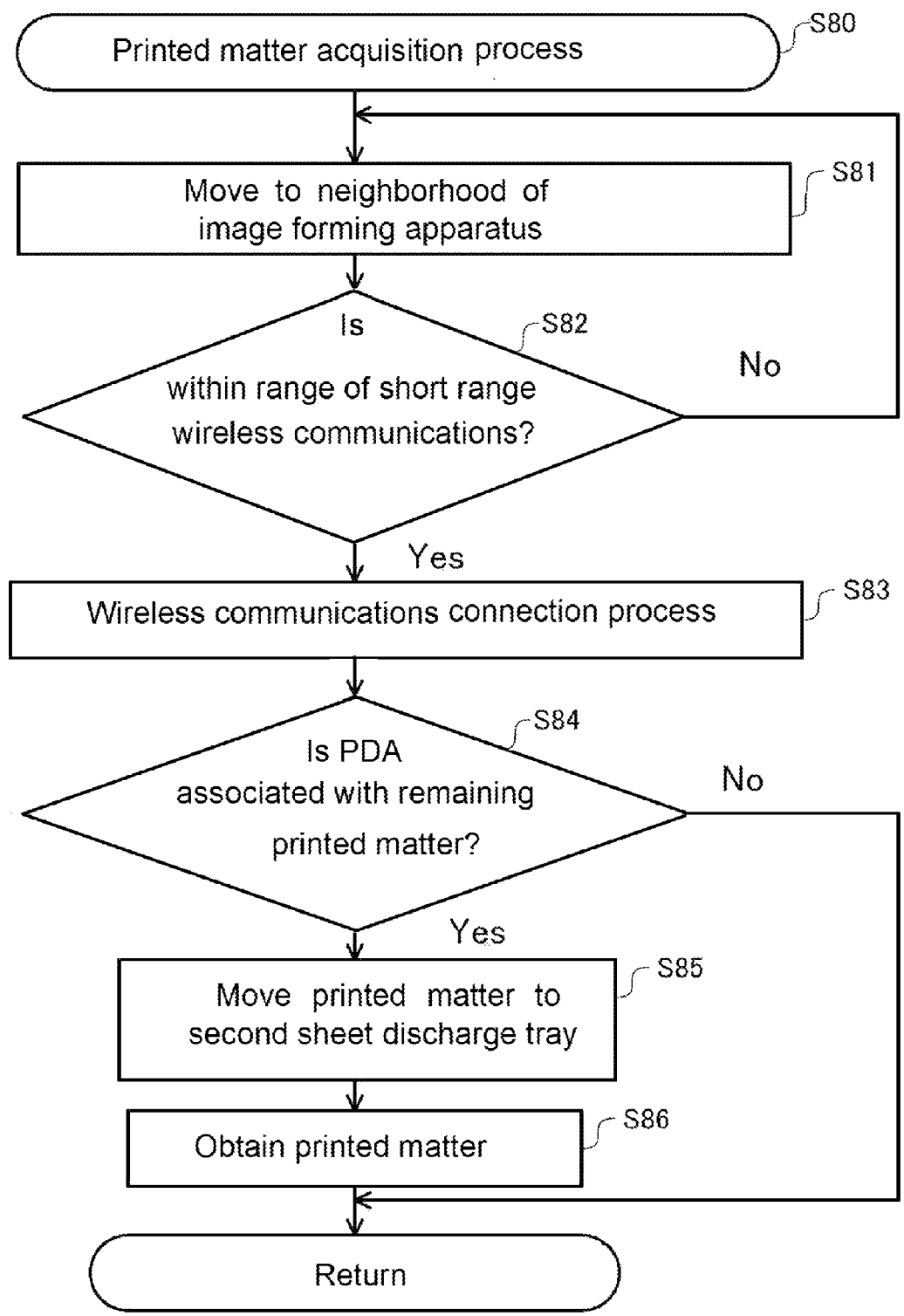
FIG. 4 illustrates a procedure for a printed matter acquisition process according to the one embodiment.

FIG. 4 illustrates a procedure for a printed matter acquisition process according to the one embodiment. At Step S81, the user approaches the image forming apparatus 1 upon the display of the completion of printing. Then, the image forming apparatus 1 stands by for reconnection with the PDA 2 associated with the printed matter stored in the printed matter storing unit 53, and the security printing with another PDA 2 is restricted. At Step S82, when the image forming apparatus 1 decides that this PDA 2 enters within the range of the short range wireless communications, the process proceeds to Step S83.

At Step S83, the image forming apparatus 1 executes a connection process for wireless communications with the PDA 2 entered within the range of the short range wireless communications. When the connection process is completed, the process proceeds to Step S84. At Step S84, the control unit 10 decides whether the connected PDA 2 is associated with the remaining printed matter or not. This decision is, for example, made based on a wireless ID of the PDA 2. When the connected PDA 2 is not associated with the remaining printed matter, the control unit 10 displays an unusable state of the security print process to the PDA 2. When the connected PDA 2 is associated with the remaining printed matter, the control unit 10 advances the process to Step S85.

However, the control unit 10 waits an elapse of a certain period of time (for example, several seconds) (The short range wireless communications TN are kept disconnected continuously.) and then advances the process to Step S85. The reason for waiting the elapse of the certain period of time is to prevent a chattering when the user moves to a neighborhood of a boundary of the range of the short range wireless communications together with the PDA 2, because, for example, there may be a case where the user just passes through near the image forming apparatus 1.

At Step S85, the security printing system 100 controls the printed matter conveying unit 50 during connection by the short range wireless communications TN to convey the printed matter from the printed matter storing unit 53 to the second sheet discharge tray 52. This ensures obtaining the printed matter from the second sheet discharge tray 52. Therefore, the user, a possessor of the printed matter, can obtain the printed matter (Step S86).

Thus, this embodiment ensures achieving the highly convenient security print process without giving an excessive load to the user.

In addition to the respective embodiments, the disclosure can also be embodied by the following modifications.

Figure 5:
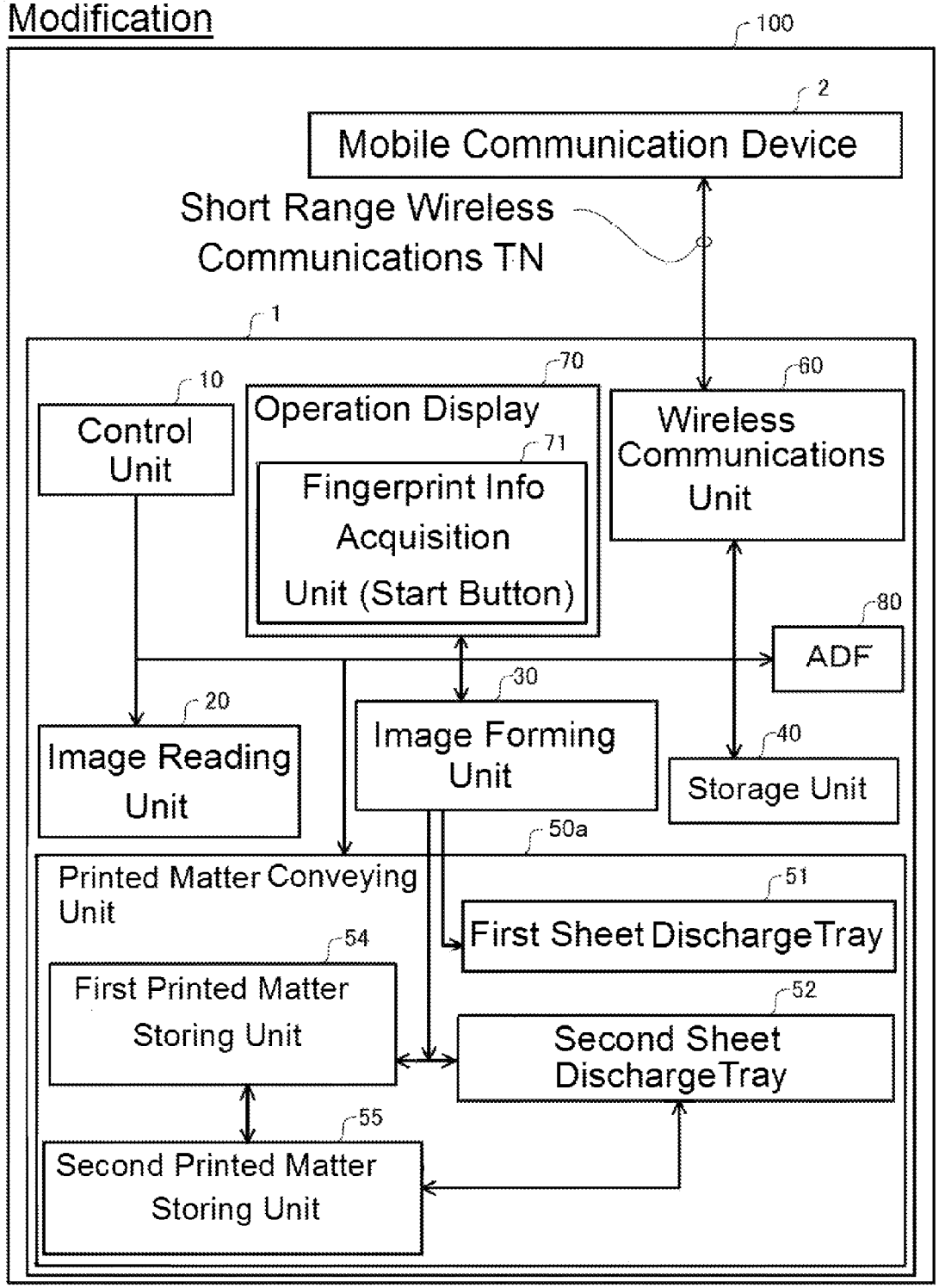
FIG. 5 illustrates a functional configuration of a security printing system according to a modification of the disclosure.

Modification 1:

The embodiment stores the printed matter in the one printed matter storing unit 53. However, as illustrated in FIG. 5, a printed matter conveying unit 50*a*, which includes a plurality of printed matter storing units 54 and 55 may be used. This ensures accepting a new security printing even if any of the plurality of printed matter storing units 54 and 55 store the printed matter associated with the PDA 2.

In this case, the number of the printed matter storing units is two. However, as long as the conveyance of the printed matter between the printed matter storing units is ensured, storing the printed matters associated with three or more PDAs is also possible, not limited to two PDAs.

Specifically, assume that the first page of the printed matter associated with a certain PDA is stored at the third sheet from the top in the printed matter storing unit 54 and the second page of the printed matter associated with the PDA is stored at the fifth sheet in the printed matter storing unit 55. In this case, conveying the two sheets of the printed matter from the printed matter storing unit 54 to the printed matter storing unit 55 ensures discharging the first page of the printed matter associated with the PDA to the second sheet discharge tray 52. Furthermore, conveying the six sheets (4 sheets+2 sheets) of the printed matter from the printed matter storing unit 55 to the printed matter storing unit 54 ensures discharging the second page of the printed matter associated with the PDA to the second sheet discharge tray 52.

Modification 2:

The respective embodiments decide the printed matter discharged to the second sheet discharge tray 52 based on the storage order (the number of sheets from the top) in the printed matter storing unit. However, for example, a unique electronic watermark different for the respective PDAs may be printed on the printed matter, the printed matter may be checked with a scanner equipped with the printed matter conveying unit, and the printed matter corresponding to the PDA may be discharged to the second sheet discharge tray 52. Furthermore, the disclosure may check the printed matter with the scanner and convey the printed matter corresponding to the PDA from the second sheet discharge tray 52 to the printed matter storing unit.

Modification 3:

The respective embodiments use the fingerprint information for authentication of the PDA. However, not limited to the fingerprint, but biological information such as an iris and a vein can also be used for authentication. With the disclosure, generally, the use of the biological information can simply execute the security print process without inputting a password. However, the use of the fingerprint information is advantageous in that the fingerprint information can be obtained at the operation of the start button without additional operation. The fingerprint information acquisition unit is also referred to as a biological information acquisition unit (also referred to as a biological information input circuit). The registered fingerprint information is also referred to as registered biological information.

Modification 4:

With the respective embodiments, the printed matter is the copied material of the document; however, this should not be constructed in a limiting sense. For example, the printed matter may be a printed matter created by a print job output by the PDA. In this case, the security printing system can also transmit and receive the print job by the short range wireless communications TN. Furthermore, the printed matter may be a printed matter based on data stored in a portable USB flash drive and other storages.

Modification 5:

The respective embodiments use BLUETOOTH (registered trademark) CLASS 1 for the short range wireless communications. However, for example, CLASS 2 (output at 2.5 mW and a range of 10 m) or CLASS 3 (output at 100 mW and a range of 100 m) may be used. In this case, the decisions at Step S50 (see FIG. 2) and Step S82 (see FIG. 4) are preferably made not by the connection and disconnection of the short range wireless communications but by a distance estimated based on radio field intensity (also referred to as a Received Signal Strength Indication (RSSI)). The radio field intensity (RSSI) is a parameter used to control communication output through BLUETOOTH.

Thus, it is only necessary that the disclosure be configured as follows. When the short range wireless communications are in a predetermined predefined state (for example, the estimated distance is within a predetermined range), the printed matter is discharged to the sheet discharge tray. When the short range wireless communications are not in the predetermined predefined state, the printed matter is conveyed from the sheet discharge tray to the printed matter storing unit. With the one embodiment, when the short range wireless communications are in the predetermined predefined state, this means that the short range wireless communications are in connection. The short range wireless communications may be a communication method other than BLUETOOTH.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A security printing system, comprising:
   an image forming apparatus; and
   a mobile communication device; wherein
   the image forming apparatus includes a biological information input circuit, a printed matter storing unit, at least one sheet discharge tray, an image forming circuit, and a processor, the biological information input circuit inputting biological information,
   registered biological information is preliminary registered with the mobile communication device,
   the image forming apparatus and the mobile communication device ensure connection by preliminary configured short range wireless communications, and
   when the image forming apparatus receives instruction to print, the processor compares the biological information with the registered biological information, creates a printed matter when the biological information matches with the registered biological information, and does not create the printed matter when the biological information does not match with the registered biological information, the biological information being input by the biological information input circuit, the registered biological information being obtained by the short range wireless communications, the processor discharging the created printed matter to any of the at least one sheet discharge tray when the short range wireless communications are in a predetermined predefined state.

2. The security printing system according to claim 1, wherein:
   the at least one sheet discharge tray includes a plurality of sheet discharge trays, the plurality of sheet discharge trays including a preliminary configured specific sheet discharge tray; and
   the image forming apparatus discharges the printed matter created when the biological information matches with the registered biological information, to the specific sheet discharge tray.

3. The security printing system according to claim 2, wherein the image forming apparatus moves the printed matter from the specific sheet discharge tray to the printed matter storing unit according to a decision that the short range wireless communications become outside of the predetermined predefined state.

4. The security printing system according to claim 2, wherein after the decision that the short range wireless communications become outside of the predetermined predefined state, the image forming apparatus discharges the printed matter from the printed matter storing unit to the specific sheet discharge tray according to a decision that the short range wireless communications enter the predetermined predefined state.

5. The security printing system according to claim 1, wherein:
   the image forming circuit prints an electronic watermark unique for each of the mobile communication devices onto the printed matter; and
   when the short range wireless communications between the image forming apparatus and the mobile communication device are in the predetermined predefined state, the image forming apparatus discharges the printed matter on which the electronic watermark corresponding to the mobile communication device has been printed.

6. An image forming apparatus used for a security printing system, the security printing system using a mobile communication device with which registered biological information is preliminary registered, the image forming apparatus comprising:
   a biological information input circuit that inputs biological information;
   a printed matter storing unit;
   at least one sheet discharge tray;
   an image forming circuit; and
   a processor; wherein
   the image forming apparatus is configured to be connected to the mobile communication device by preliminary configured short range wireless communications, and
   when the image forming apparatus receives instruction to print, the processor compares the biological information with the registered biological information, creates a printed matter when the biological information matches with the registered biological information, does not create the printed matter when the biological information does not match with the registered biological information, the biological information being input by the biological information input circuit, the image forming apparatus being configured to obtain the registered biological information from the mobile communication device via the short range wireless communications, and discharges the created printed matter to any of the at least one sheet discharge tray when the short range wireless communications are in a predetermined predefined state.

7. A security printing method that uses an image forming apparatus and a mobile communication device, the security printing method comprising:

preparing the image forming apparatus and the mobile communication device, the image forming apparatus including a biological information input circuit, a printed matter storing unit, at least one sheet discharge tray, an image forming circuit, and a processor, the biological information input circuit inputting biological information;

preliminary registering registered biological information with the mobile communication device;

connecting the image forming apparatus and the mobile communication device by preliminary configured short range wireless communications;

when the image forming apparatus receives instruction to print, comparing the biological information with the registered biological information, the step being performed by the processor;

creating a printed matter when the biological information matches with the registered biological information, and not creating the printed matter when the biological information does not match with the registered biological information, the step being performed by the processor, the biological information being input by the biological information input circuit, the registered biological information being obtained by the short range wireless communications; and discharging the created printed matter to any of the at least one sheet discharge tray when the short range wireless communications are in a predetermined predefined state, the step being performed by the processor.

* * * * *